US009844058B2

(12) United States Patent
Xiao et al.

(10) Patent No.: US 9,844,058 B2
(45) Date of Patent: Dec. 12, 2017

(54) METHOD, DEVICE AND SYSTEM FOR REPORTING RF CAPABILITY IN CARRIER AGGREGATION

(71) Applicant: Huawei Technologies Co., Ltd., Shenzhen, Guangdong (CN)

(72) Inventors: Dengkun Xiao, Shenzhen (CN); Jing Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 664 days.

(21) Appl. No.: 13/886,752

(22) Filed: May 3, 2013

(65) Prior Publication Data

US 2013/0235840 A1    Sep. 12, 2013

Related U.S. Application Data

(63) Continuation of application No. PCT/CN2011/081707, filed on Nov. 3, 2011.

(30) Foreign Application Priority Data

Nov. 4, 2010    (CN) .......................... 2010 1 0530569

(51) Int. Cl.
*H04L 1/00*  (2006.01)
*H04W 72/04* (2009.01)
(Continued)

(52) U.S. Cl.
CPC ........... *H04W 72/048* (2013.01); *H04L 5/001* (2013.01); *H04L 5/0091* (2013.01);
(Continued)

(58) Field of Classification Search
CPC . H04W 72/048; H04W 72/00; H04W 76/028; H04W 24/10; H04W 28/00;
(Continued)

(56) References Cited

U.S. PATENT DOCUMENTS 8,526,322 B2* 9/2013 Jung .................... H04W 24/10
370/252
2009/0316659 A1* 12/2009 Lindoff ............... H04J 11/0069
370/332
(Continued)

FOREIGN PATENT DOCUMENTS

CN    101784081 A    7/2010
CN    101808402 A    8/2010
(Continued)

OTHER PUBLICATIONS

"3GPP TS 36.331—3$^{rd}$ Generation Partnership Project; Technical Specification Group Radio Access Network; Evolved Universal Terrestrial Radio Access (E-UTRA); Radio Resource Control (RRC); Protocol specification (Release 8)," Mar. 2010, Version 8.9.0, 3$^{rd}$ Generation Partnership Project, Valbonne, France.
(Continued)

*Primary Examiner* — Edan Orgad
*Assistant Examiner* — Vanneilian Lalchinthang
(74) *Attorney, Agent, or Firm* — Leydig, Voit & Mayer, Ltd.

(57) ABSTRACT

Embodiments of the present invention provide a method, a device and a system for reporting RF capability in carrier aggregation, used to reduce signaling overhead when a UE reports information. The method provided in the embodiments of the present invention includes: identifying a combination of identifiers of frequency bands that support the carrier aggregation, and generating a set of combinations of identifiers of frequency bands that support the carrier aggregation; identifying identifiers of frequency bands that do not support the carrier aggregation, and generating a set of identifiers of frequency bands that do not support the carrier aggregation; and sending the set of combinations of identifiers of frequency bands that support the carrier aggregation
(Continued)

and the set of identifiers of frequency bands that do not support the carrier aggregation.

18 Claims, 2 Drawing Sheets

(51) Int. Cl.
    *H04W 4/00*     (2009.01)
    *H04L 5/00*     (2006.01)
    *H04W 24/10*     (2009.01)
    *H04W 28/06*     (2009.01)
    *H04W 72/00*     (2009.01)

(52) U.S. Cl.
    CPC ........... *H04L 5/0092* (2013.01); *H04W 24/10* (2013.01); *H04W 28/06* (2013.01); *H04W 72/00* (2013.01)

(58) Field of Classification Search
    CPC ...... H04W 24/00; H04L 5/001; H04L 5/0091; H04L 5/0092; H04L 12/26
    USPC .......................................................... 370/329
    See application file for complete search history.

(56) References Cited

U.S. PATENT DOCUMENTS

| | | | |
|---|---|---|---|
| 2010/0130218 A1* | 5/2010 | Zhang | H04W 48/12 455/450 |
| 2010/0226327 A1* | 9/2010 | Zhang et al. | 370/329 |
| 2010/0303011 A1* | 12/2010 | Pan | H04L 5/001 370/328 |
| 2011/0026475 A1* | 2/2011 | Lee et al. | 370/329 |
| 2011/0103243 A1* | 5/2011 | Larsson | H04L 5/001 370/252 |
| 2011/0267978 A1* | 11/2011 | Etemad | H04L 5/003 370/254 |
| 2011/0317628 A1* | 12/2011 | Lee | H04L 27/2601 370/328 |
| 2012/0002635 A1* | 1/2012 | Chung | H04W 76/048 370/329 |
| 2012/0009935 A1* | 1/2012 | Wei | H04L 5/001 455/450 |
| 2012/0039179 A1* | 2/2012 | Seo | H04L 5/001 370/241 |
| 2012/0082125 A1* | 4/2012 | Huang | H04L 5/0007 370/329 |
| 2012/0327878 A1* | 12/2012 | Pedersen | H04L 5/006 370/329 |
| 2013/0223321 A1* | 8/2013 | Lee | H04W 72/0453 370/312 |

FOREIGN PATENT DOCUMENTS

| | | |
|---|---|---|
| CN | 101873648 A | 10/2010 |
| EP | 2244411 A2 | 10/2010 |
| WO | WO 2010083741 A1 | 7/2010 |

OTHER PUBLICATIONS

"3GPP TS 36.306—3$^{rd}$ Generation Partnership Project; Technical Specification Group Radio Access Network; Evolved Universal Terrestrial Radio Access (E-UTRA); User Equipment (UE) radio access capabilities (Release 9)," Sep. 2010, Version 9.3.0, 3$^{rd}$ Generation Partnership Project, Valbonne, France.

"3GPP TS 25.331—3$^{rd}$ Generation Partnership Project; Technical Specification Group Radio Access Network; Radio Resource Control (RRC); Protocol Specification (Release 9)," Dec. 2009, Version 9.1.0, 3$^{rd}$ Generation Partnership Project, Valbonne, France.

International Search Report in corresponding International Patent Application No. PCT/CN2011/081707 (dated Feb. 23, 2012).

Written Opinion of the International Searching Authority in corresponding International Patent Application No. PCT/CN2011/081707 (dated Feb. 23, 2012).

"Further discussion on LTE-A UE categories," 3GPP TSG-RAN WG4 Ad-hoc meeting #10-02, Dublin, Ireland, R4-101385, 3$^{rd}$ Generation Partnership Project, Valbonne, France (Apr. 12-26, 2010).

"UE capability signalling for CA capable UEs," 3GPP TSG-RAN WG2 Meeting #71 bis, Xi'an, China, R2-105468, 3$^{rd}$ Generation Partnership Project, Valbonne, France (Oct. 11-15, 2010).

"Further discussions on LTE-A UE categories/capabilities," 3GPP TSG-RAN WG4 Ad-hoc meeting #2010-04, Xi'an, China, R4-103470, 3$^{rd}$ Generation Partnership Project, Valbonne, France (Oct. 11-15, 2010).

\* cited by examiner

METHOD, DEVICE AND SYSTEM FOR REPORTING RF CAPABILITY IN CARRIER AGGREGATION

CROSS-REFERENCE TO RELATED APPLICATIONS

This application is a continuation of International Patent Application No. PCT/CN2011/081707, filed on Nov. 3, 2011, which claims priority to Chinese Patent Application No. 201010530569.0, filed on Nov. 4, 2010, both of which are hereby incorporated by reference in their entireties.

FIELD OF TECHNOLOGY

The present invention relates to the field of communication technologies, and in particular, to a method, a device and a system for reporting RF capability in carrier aggregation.

BACKGROUND

A new generation communication system adopts carrier aggregation (Carrier aggregation, CA) technology. Unlike a conventional communication system, a UE can use multiple downlink serving cells to receive data, such as a primary serving cell (Pcell) or a secondary serving cell (Scell). Deactivation is not performed for the Pcell, whereas a base station can flexibly perform activation and deactivation for the Scell.

In the conventional communication system, reporting radio frequency (RF) capability by a user equipment (UE) includes reporting a list of RF-supported frequency bands, and information indicating whether other frequency bands need to start a measurement gap (gap) for each of the frequency bands. When the carrier aggregation feature is introduced, the UE needs to report more information.

Embodiments of the present invention are used to reduce signaling overhead when the UE reports information.

SUMMARY

Embodiments of the present invention provide a method, a device and a system for reporting RF (Radio Frequency, radio frequency) capability in carrier aggregation, which are used to reduce signaling overhead when a UE reports information.

An embodiment of the present invention provides a method for reporting RF capability in carrier aggregation, including:

identifying a combination of identifiers of frequency bands that support carrier aggregation, and generating a set of combinations of identifiers of frequency bands that support carrier aggregation;

identifying identifiers of frequency bands that do not support carrier aggregation and generating a set of identifiers of frequency bands that do not support carrier aggregation; and sending the set of combinations of identifiers of frequency bands that support carrier aggregation and the set of identifiers of frequency bands that do not support carrier aggregation.

An embodiment of the present invention provides a device for reporting RF capability in carrier aggregation, including:

a first identification module, configured to identify a combination of identifiers of frequency bands that support carrier aggregation, and generate a set of combinations of identifiers of frequency bands that support carrier aggregation;

a second identification module, configured to identify identifiers of frequency bands that do not support carrier aggregation, and generate a set of identifiers of frequency bands that do not support carrier aggregation; and a sending module, configured to send the set of combinations of identifiers of frequency bands that support carrier aggregation, which is identified by the first identification module, and the set of identifiers of frequency bands that do not support carrier aggregation, which is identified by the second identification module.

By sending sets of identifiers of frequency bands where the UE supports carrier aggregation or does not supports carrier aggregation, the method, the device and the system for reporting RF capability in carrier aggregation provided in the embodiments of the present invention avoids sending complete sets of identifiers of frequency bands supported by the UE, thereby avoiding repeated reporting and reducing signaling overhead.

BRIEF DESCRIPTION OF THE DRAWINGS

In order to better describe technical solutions of embodiments of the present invention or the prior art, the following will briefly introduce drawings necessary for describing embodiments or prior art. Obviously, the drawings below are merely some embodiments of the present invention, and other drawings can be obtained by those with ordinary skill in the art based on these drawings without doing any creative work.

DETAILED DESCRIPTION

Figure 1:
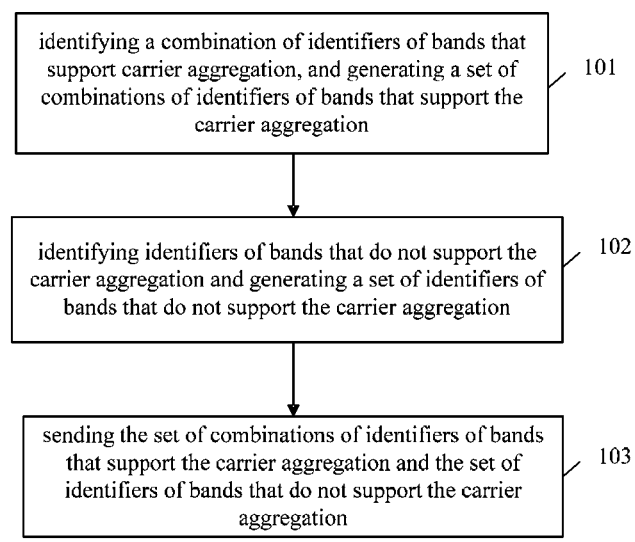
FIG. 1 is a flow chart of a method for reporting RF capability in carrier aggregation according to an embodiment of the present invention.

FIG. 1 is a flow chart of a method for reporting RF capability in carrier aggregation according to an embodiment of the present invention, and this embodiment includes:

Step 101: identifying a combination of identifiers of frequency bands that support carrier aggregation and generating a set of combinations of identifiers of frequency bands that support the carrier aggregation.

Step 102: identifying identifiers of frequency bands that do not support the carrier aggregation and generating a set of identifiers of frequency bands that do not support the carrier aggregation.

Step 103: sending the set of combinations of identifiers of frequency bands that support the carrier aggregation and the set of identifiers of frequency bands that do not support the carrier aggregation.

The executive subject of this embodiment of the present invention is a user equipment UE.

According to the present invention, firstly, a combination of identifiers of frequency bands that support carrier aggregation is identified and a set of combinations of identifiers of frequency bands that support the carrier aggregation is generated. The set of combinations of identifiers of frequency bands that support the carrier aggregation is used to indicate one or more combinations of frequency bands where the UE supports the carrier aggregation. In this step, the UE may first identify combinations of frequency bands where the carrier aggregation is supported by the UE. In a new generation communication system, the UE can support the carrier aggregation technology. For example, the UE supports five frequency bands which are numbered, in order, B1, B2, B3, B4, and B5. Assuming the UE supports the carrier aggregation between B1 and B2 and the carrier aggregation between B3 and B4, the UE identifies a combination of identifiers of frequency bands that support the carrier aggregation, and the combination of identifiers indicates that the UE can support the carrier aggregation between B1 and B2 and the carrier aggregation between B3 and B4. For example, the UE can generate a set of combinations of identifiers of frequency bands of (B1, B2) and (B3, B4).

Then a set of identifiers of frequency bands that do not support the carrier aggregation is identified, and the set of identifiers of frequency bands that do not support the carrier aggregation is generated. The set of identifiers of frequency bands that do not support the carrier aggregation is used to indicate the frequency bands where the UE does not support the carrier aggregation. In this step, the UE can identify the frequency bands where the carrier aggregation is not supported by the UE. In the new generation communication system, the UE can support the carrier aggregation technology. For example, the UE supports five frequency bands which are numbered, in order, B1, B2, B3, B4, and B5. Assuming the UE does not support the carrier aggregation between other frequency bands and B5, the UE identifies a set of identifiers of frequency bands that do not support the carrier aggregation, and the identifiers indicate that the UE does not support the carrier aggregation of B5. For example, the UE can generate a set of identifiers of frequency bands of (B5).

Afterwards, the UE feeds back to a base station the set of combinations of identifiers of frequency bands that support the carrier aggregation and the set of identifiers of frequency bands that do not support the carrier aggregation which are generated in the above mentioned steps.

After receiving feedback from the UE, the base station can analyze sets of identifiers of frequency bands that support the carrier aggregation and that do not support the carrier aggregation sent by the UE, extract their contents, and schedule wireless resources based on such contents.

According to this embodiment of the present invention, by sending sets of identifiers of frequency bands where the carrier aggregation can and cannot be supported by the UE, sending complete sets of identifiers of frequency bands supported by the UE is avoided, thereby avoiding repeated reporting and reducing signaling overhead.

Figure 2:
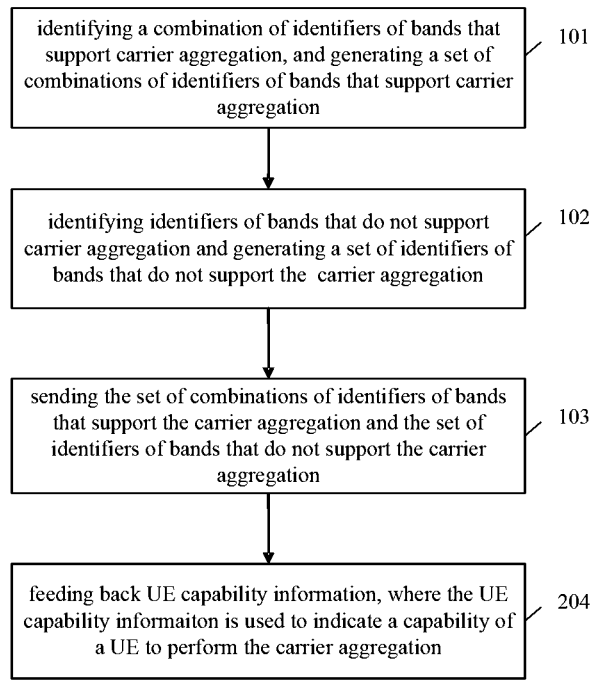
FIG. 2 is a flow chart of another method for reporting RF capability in carrier aggregation, according to an embodiment of the present invention.

FIG. 2 is a flow chart of another method for reporting RF capability in carrier aggregation according to an embodiment of the present invention. This embodiment includes the following steps:

Step 101: identifying a combination of identifiers of frequency bands that support the carrier aggregation and generating a set of combinations of identifiers of frequency bands that support the carrier aggregation.

Step 102: identifying identifiers of frequency bands that do not support the carrier aggregation and generating a set of identifiers of frequency bands that do not support the carrier aggregation.

Step 103: sending the set of combinations of identifiers of frequency bands that support the carrier aggregation and the set of identifiers of frequency bands that do not support the carrier aggregation.

Step 204: feeding back UE capability information, the UE capability information being used to indicate a capability of a UE to perform the carrier aggregation.

The executive subject of the embodiment of the present invention is a user equipment UE. This embodiment differs from the above embodiment in further reporting UE capability information.

The present invention first identifies a combination of identifiers of frequency bands that support the carrier aggregation, and generates a set of combinations of identifiers of frequency bands that support the carrier aggregation. The set of combinations of identifiers of frequency bands that support the carrier aggregation is used to indicate one or more combinations of frequency bands where the UE supports the carrier aggregation. In this step, the UE may first identify combinations of frequency bands where the carrier aggregation is supported by the UE. In the new generation communication system, the UE can support the carrier aggregation technology. For example, the UE supports five frequency bands which are numbered, in order, B1, B2, B3, B4, and B5. Assuming the UE supports the carrier aggregation between B1 and B2 and the carrier aggregation between B3 and B4, the UE identifies a combination of identifiers of frequency bands that support the carrier aggregation, and the combination of identifiers indicates that the UE can support the carrier aggregation between B1 and B2 and the carrier aggregation between B3 and B4. For example, the UE can generate a set of combinations of identifiers of frequency bands of (B1, B2) and (B3, B4).

Then a set of identifiers of frequency bands that do not support the carrier aggregation is identified, and the set of identifiers of frequency bands that do not support the carrier aggregation is generated. The set of identifiers of frequency bands that do not support the carrier aggregation is used to indicate the frequency bands where the UE does not support the carrier aggregation. In this step, the UE can identify the frequency bands where the carrier aggregation is not supported by the UE. In the new generation communication system, the UE can support the carrier aggregation technology. For example, the UE supports five frequency bands which are numbered, in order, B1, B2, B3, B4, and B5. Assuming the UE does not support the carrier aggregation between other frequency bands and B5, the UE identifies a set of identifiers of frequency bands that do not support the carrier aggregation, and the identifiers indicate that the UE does not support the carrier aggregation of B5. For example, the UE can generate a set of identifiers of frequency bands of (B5).

Afterwards, UE feed back to a base station the set of combinations of identifiers of frequency bands that support the carrier aggregation and the set of identifiers of frequency bands that do not support the carrier aggregation which are generated in the above mentioned steps.

UE capability information is then reported, the UE capability information being used to indicate a capability of the UE to perform the carrier aggregation. The UE capability information can include continuous frequency bandwidth processing capability and/or other information such as protocol version supported by the UE, and may further include:

continuous frequency bandwidth processing capability information, the continuous frequency bandwidth processing capability information being used to indicate a maximum continuous processing frequency bandwidth supported by the UE.

After receiving feedback from the UE, the base station can analyze the UE capability information, extract its content, and schedule wireless resources based on such content.

By sending sets of identifiers of frequency bands where the carrier aggregation can and cannot be supported by the UE, and further by reporting the continuous frequency bandwidth processing capability or UE capability information, the embodiment of the present invention avoids sending complete sets of identifiers of frequency bands supported by UE, thereby avoiding repeated reporting and reducing signaling overhead.

Figure 3:
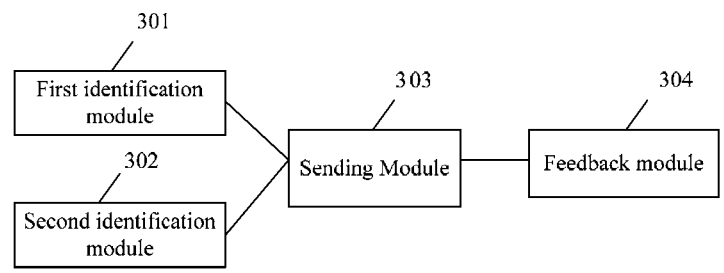
FIG. 3 is a block diagram of another device for reporting RF capability in carrier aggregation, according to an embodiment of the present invention.

FIG. 3 is a block diagram of another device for reporting RF capability in carrier aggregation according to an embodiment of the present invention. This embodiment includes:

a first identification module 301, configured to identify a combination of identifiers of frequency bands that support carrier aggregation, and generate a set of combinations of identifiers of frequency bands that support the carrier aggregation;

a second identification module 302, configured to identify identifiers of frequency bands that do not support the carrier aggregation, and generate a set of identifiers of frequency bands that do not support the carrier aggregation; and a sending module 303, configured to send the set of combinations of identifiers of frequency bands that support the carrier aggregation, which is identified by the first identification module, and the set of identifiers of frequency bands that do not support the carrier aggregation, which is identified by the second identification module.

This embodiment of the present invention is used to implement methods of the embodiments illustrated in FIG. 1 and FIG. 2.

This embodiment may further include:

a feedback module 304, configured to feed back UE capability information, the UE capability information being used to indicate a capability of a UE to perform the carrier aggregation.

The feedback module may be further configured to feed back the UE capability information, wherein the UE capability information includes continuous frequency bandwidth processing capability information, the continuous frequency bandwidth processing capability information being used to indicate a maximum continuous processing frequency bandwidth supported by the UE.

The set of combinations of identifiers of frequency bands that support the carrier aggregation includes one or more combinations of frequency bands indicating the carrier aggregation supported by the user equipment UE.

The set of identifiers of frequency bands that do not support the carrier aggregation includes frequency bands indicating the carrier aggregation not supported by the UE.

According to this embodiment of the present invention, by sending sets of identifiers of frequency bands where the carrier aggregation is supported and not supported by the UE via the sending module, and further by reporting the continuous frequency bandwidth processing capability or UE capability information via the feedback module, sending complete sets of identifiers of frequency bands supported by UE is avoided, thereby avoiding repeated reporting and reducing signaling overhead.

Those skilled in the art can clearly understand through description of the above embodiments that the present invention can be implemented either by software plus necessary universal hardware, which is preferred in many circumstances, or implemented only by hardware. Based on such understanding, technical solutions of the present invention can substantially, or otherwise the portion thereof having contributions to the prior art, be embodied by a software product stored in a readable storage medium such as a computer's floppy disc, hard disk or optical disk, etc., which includes several instructions used to enable a computer device such as a PC, a server or a web device and the like to implement the methods in embodiments of the present invention described above.

The above are only specific embodiments of the present invention, and the present invention is not limited thereto, and all modifications and replacements readily derived by those skilled in the art within the technical scope disclosed in the present invention shall fall within the protection scope of the present invention. Therefore, the protection scope of the present invention is subject to the appended claims.

What is claimed is:

1. A method for reporting Radio Frequency (RF) capability in carrier aggregation, comprising:
    identifying, by a user equipment, a combination of first identifiers of first frequency bands that support the carrier aggregation, and generating a set of combinations of the first identifiers of the first frequency bands that support the carrier aggregation;
    identifying second identifiers of second frequency bands that do not support the carrier aggregation and generating a set of the second identifiers of the second frequency bands that do not support the carrier aggregation; and
    sending the set of the combinations of the first identifiers and the set of the second identifiers to a base station.

2. The method according to claim 1, further comprising:
    feeding back user equipment (UE) capability information, wherein the UE capability information is used to indicate a capability of a UE to perform the carrier aggregation.

3. The method according to claim 2, wherein the UE capability information comprises continuous frequency bandwidth processing capability information, which is used to indicate a maximum continuous processing frequency bandwidth supported by the UE.

4. The method according to claim 1, wherein the set of the combinations of the first identifiers comprises one or more combinations of frequency bands indicating that the carrier aggregation is supported by the UE.

5. The method according to claim 1, wherein the set of the second identifiers comprises frequency bands indicating that the carrier aggregation is not supported by the UE.

6. The method according to claim 2, wherein the set of the combinations of the first identifiers comprises one or more combinations of frequency bands indicating that the carrier aggregation is supported by the UE.

7. The method according to claim 3, wherein the set of the combinations of the first identifiers comprises one or more combinations of frequency bands indicating that the carrier aggregation is supported by the UE.

8. The method according to claim 2, wherein the set of the second identifiers comprises frequency bands indicating that the carrier aggregation is not supported by the UE.

9. The method according to claim 3, wherein the set of the second identifiers comprises frequency bands indicating that the carrier aggregation is not supported by the UE.

10. A device for reporting radio frequency (RF) capability in carrier aggregation the device comprises:
    a processor and a non-transitory computer readable storage medium, wherein the non-transitory computer readable storage medium comprises computer program codes which when executed by the processor cause the processor to be configure to:

identify a combination of first identifiers of first frequency bands that support the carrier aggregation, and generate a set of combinations of the first identifiers of the first frequency bands that support the carrier aggregation;

identify second identifiers of second frequency bands that do not support the carrier aggregation, and generate a set of the second identifiers of the second frequency bands that do not support the carrier aggregation; and send the set of the combinations of the first identifiers, and the set of the second identifiers.

11. The device according to claim 10, wherein the non-transitory computer readable storage medium comprises computer program codes which when executed by the processor cause the processor to be configured to feed back user equipment (UE) capability information, the UE capability information being used to indicate a capability of a UE to perform the carrier aggregation.

12. The device according to claim 11, wherein the non-transitory computer readable storage medium comprises computer program codes which when executed by the processor to be configured to feed back the UE capability information, wherein the UE capability information comprises continuous frequency bandwidth processing capability information, which is used to indicate a maximum continuous processing frequency bandwidth supported by the UE.

13. The device according to claim 10, wherein the set of the combinations of the first identifiers of frequency bands that support the carrier aggregation comprises one or more combinations of frequency bands indicating that the carrier aggregation is supported by the UE.

14. The device according to claim 10, wherein the set of the second identifiers comprises frequency bands indicating that the carrier aggregation is not supported by the UE.

15. The device according to claim 11, wherein the set of the combinations of the first identifiers comprises one or more combinations of frequency bands indicating that the carrier aggregation is supported by the UE.

16. The device according to claim 12, wherein the set of the combinations of the first identifiers comprises one or more combinations of frequency bands indicating that the carrier aggregation is supported by the UE.

17. The device according to claim 11, wherein the set of the second identifiers comprises frequency bands indicating that the carrier aggregation is not supported by the UE.

18. The device according to claim 12, wherein the set of the second identifiers comprises frequency bands indicating that the carrier aggregation is not supported by the UE.

* * * * *